June 13, 1950   F. J. ADAMEK   2,511,315
MOTOR REVERSING MEANS
Filed July 12, 1948
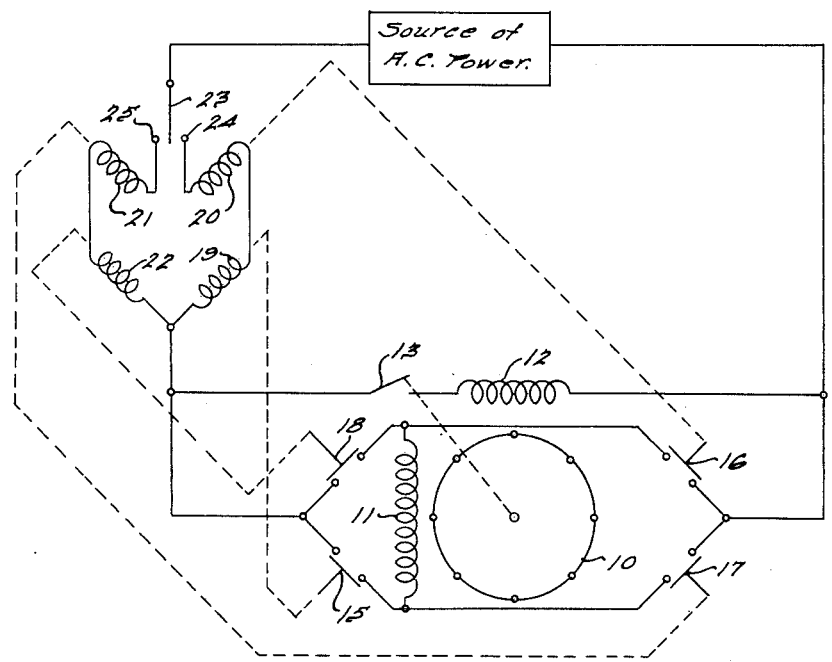
INVENTOR.
Frank J. Adamek.
BY
Maxwell R. Murphy
ATTORNEY.

Patented June 13, 1950

2,511,315

UNITED STATES PATENT OFFICE 2,511,315

MOTOR REVERSING MEANS

Frank J. Adamek, Detroit, Mich., assignor to F. L. Jacobs Co., Detroit, Mich., a corporation of Michigan Application July 12, 1948, Serial No. 38,313

2 Claims. (Cl. 318—207)

This invention relates to a reversing means for an electric motor, or more particularly, a split-phase induction motor. The invention also relates to the use of speed-responsive means for controlling a motor and for participating in the reversal thereof.

An object of the present invention is to provide means for quickly reversing an electric motor of the split-phase type. It is proposed to operate the motor alternately in different directions at desired time intervals. For example, the motor may be reversed as desired at various time intervals or may be reversed at regular intervals by automatic apparatus such as a timer. A motor operated in this fashion may be used to drive a clothes washer, which for known reasons is advantageously rotated alternately in different directions.

A further object relates to the association of reversing means for a motor with speed-responsive means cutting in and out an auxiliary field used in conjunction with a main field to start the motor. Each time such a motor is reversed, the auxiliary field must be placed in use, and it is important properly to relate the reversal of the motor with the use of the auxiliary field.

Other objects will appear from the disclosure.

Reference is made to the accompanying drawing, which diagrammatically illustrates a preferred form of the invention.

The reference character 10 designates the rotor of a motor of the split-phase induction type. The rotor 10 is driven at operating speed by a main field winding 11. For starting the rotor the main winding is assisted by an auxiliary field winding 12. The auxiliary winding is connected to a switch 13, which is responsive to the speed of the rotor 10 in such a way as to open and thereby to disconnect the auxiliary winding at some relatively high speed, for example, 1500 R. P. M., and to close again and thereby to reconnect the auxiliary winding upon fall of rotor speed to a lower speed, for example, 800 R. P. M. The windings are spaced in phase relation to one another and thereby are enabled to start the rotor and to bring it to the speed at which the auxiliary winding is disconnected. The phase relation of the windings is different, because the impedances associated with the two windings are different from one another. This may be accomplished by a supplemental resistance in series with the auxiliary winding or by a reactance in parallel with the auxiliary winding or by a difference in reactances associated extrinsically or intrinsically with the windings.

The main winding 11 is connected either through the switches 15 and 16 or through the switches 17 and 18. When the switches 15 and 16 are closed, the windings 11 and 12 have one phase relation with one another and cause the rotor to rotate in one direction. When the switches 17 and 18 are closed, the windings have a reversed phase relation with one another and cause the rotor to rotate in the opposite direction. Switches 15 and 16 are closed when current flows through the actuating and holding coils 19 and 20, respectively, and are open when no current flows through these coils. Switches 17 and 18 are closed when current flows through holding coils 21 and 22, respectively, and are open when no current flows through these coils. Selector 23 determines by engaging contact 24 or 25 whether current shall flow through holding coils 19 and 20 or holding coils 21 and 22. The selector 23 may be manually operated to shift from contact 24 and 25 and back again at desired regular or irregular time intervals, or some automatic device such as a timer may shift the selector between contacts.

Assume that the rotor is at rest and that the selector 23 engages contact 24. Current now flows from the source of alternating-current power through the holding coils 19 and 20 by way of the auxiliary winding 12 and the switch 13, closed because the rotor is at rest. Holding coils 19 and 20 close switches 15 and 16, and current flows through the main coil 11. Now the rotor 10 begins to rotate in the direction determined by the phase relation of the windings produced by the closing of switches 15 and 16. When the appropriate high speed of the rotor 10 is reached, the switch 13 is opened, disconnecting the auxiliary winding 12. Now the main winding 11 drives the rotor 10 alone.

Assume now that the selector is shifted from contact 24 to contact 25. Flow of current through the holding coils 19 and 20 is interrupted, and the switches 15 and 16 are opened, interrupting the flow of current to the main winding 11. Current does not at once flow through the holding coils 21 and 22, because the switch 13 is open and remains open until the rotor slows to cut-in speed below the cut-out speed at which the switch 13 opened and disconnected the auxiliary winding 12. When cut-in speed is reached by the rotor and the switch 13 closes to reconnect the auxiliary winding, current also flows through the holding coils 21 and 22, causing them to close switches 17 and 18 and to reconnect the main winding 11 in reversed phase relation to the auxiliary winding. The windings now slow the rotor 10 to a stop and cause it to rotate in the opposite direction. When the appropriate high speed in this direction is reached, the switch 13 is opened, and the auxiliary winding 12 is disconnected.

As pointed out, when the selector is shifted from one contact to the other, current does not immediately flow through the coils associated with the particular contact engaged. Consequently, current does not immediately flow to the main winding 11, but must await sufficient drop in rotor speed for the auxiliary winding to be reconnected. If current flowed immediately through the main winding, even though the main winding be reversed, the rotor would be driven in the original direction without reversing so long as the rotor did not slow below the speed at which the main winding could drive it alone.

It is to be noted that each pair of holding coils is connectible with the source of power through either or both of two parallel paths. One path has the auxiliary winding and the speed-responsive switch 13 and enables the holding coils to be energized when the rotor speed is low enough for the switch to be closed, in spite of the fact that all of the switches 15, 16, 17, and 18 are open. The other path includes the main winding 11 and either switches 15 and 16 or switches 17 and 18. This path assures that the current continues to flow through the pair of holding means connected to the selector 23 and through the main winding 11, in spite of the fact that the other path is opened by opening of the switch 13 due to arrival of rotor speed at the high value.

As pointed out above, a preferred form of the invention only has been illustrated and the showing is diagrammatic in form. It is desired to emphasize the fact that the invention is applicable to types of motors other than that shown, and the invention in its broader aspect is not limited to the precise embodiment described.

The switch 13 may be centrifugally actuated or it may be actuated by other means not illustrated. The pairs of switches 15, 16 and 17, 18, respectively, may take the form of double-pole, single-throw relays, which may be obtained commercially.

I claim:

1. A control system for a single-phase induction motor having a running winding and a starting winding connected in spaced phase relation thereto comprising, a switch operable in response to motor speed for deenergizing said starting winding when the speed of the motor is above a predetermined value, a first pair of switches for connecting the running winding to the line, a second pair of switches for connecting the running winding to the line in reverse-phase relation, means for operating said first and second pairs of switches comprising first and second relay coils respectively, said first and second relay coils being respectively connected in series with said windings, and means for alternately energizing said first and second relay coils.

2. In combination with a single-phase induction motor having a running winding, an auxiliary split-phase starting winding and a speed-responsive switch connected in series with said starting winding for deenergizing said winding at predetermined motor speeds, means for reversing rotation of said motor comprising two pairs of switches for alternately reversing current flow through the running winding, current responsive relay coils for closing said respective pairs of switches, said relay coils being connected in series with said windings, and means for alternately connecting said coils to the power line.

FRANK J. ADAMEK.

REFERENCES CITED

The following references are of record in the file of this patent:

UNITED STATES PATENTS

| Number | Name | Date |
|---|---|---|
| 1,316,009 | Weber | Sept. 16, 1919 |
| 2,285,687 | Snyder | June 9, 1942 |
| 2,320,176 | Dunham et al. | May 25, 1943 |
| 2,459,479 | Weinland | Jan. 18, 1949 |